(12) United States Patent
Dube et al.

(10) Patent No.: US 10,394,743 B2
(45) Date of Patent: Aug. 27, 2019

(54) INTERCHANGEABLE I/O MODULES WITH INDIVIDUAL AND SHARED PERSONALITIES

(71) Applicant: Dell Products, L.P., Round Rock, TX (US)

(72) Inventors: Shawn Joel Dube, Austin, TX (US); Robert W. Johnson, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 14/723,821

(22) Filed: May 28, 2015

(65) Prior Publication Data

US 2017/0075847 A1 Mar. 16, 2017

(51) Int. Cl.
*G06F 13/40* (2006.01)
*G06F 13/20* (2006.01)
*G06F 13/42* (2006.01)

(52) U.S. Cl.
CPC .......... *G06F 13/4068* (2013.01); *G06F 13/20* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 8,516,089 B2* | 8/2013 | Johnsen | ................... | G06F 11/30 709/221 |
| 8,547,825 B2* | 10/2013 | Armstrong | .............. | H04L 41/24 370/215 |
| 9,913,395 B2* | 3/2018 | Milligan | ............... | H05K 7/1409 |
| 2003/0208531 A1* | 11/2003 | Matters | ............... | G06F 11/2002 709/203 |
| 2004/0210695 A1* | 10/2004 | Weber | ..................... | G06F 9/526 710/240 |
| 2005/0041970 A1* | 2/2005 | Harai | ................. | H04Q 11/0005 398/51 |
| 2005/0186807 A1* | 8/2005 | Budny | ................... | H01R 12/52 439/65 |
| 2006/0018332 A1* | 1/2006 | Kakani | ................. | H04L 1/1614 370/428 |
| 2006/0064508 A1* | 3/2006 | Panwar | .................. | H04L 49/90 709/250 |

(Continued)

*Primary Examiner* — Henry Tsai
*Assistant Examiner* — Christopher A Bartels
(74) *Attorney, Agent, or Firm* — Norton Rose Fulbright US LLP

(57) ABSTRACT

Methods and systems for connecting interchangeable input/output (I/O) modules having individual and shared personalities may include a generic I/O bay of a server hosting one or more compute nodes configured to be connected to one or more removable I/O modules. A first connector coupled to a first I/O module may connect the first I/O module to a compute node having a second connector. The first I/O module may be oriented about a first axis. The compute node may be oriented about a second axis. The first connector and the second connector may be capable of being connected in a plurality of orientations. In one embodiment the second axis may be orthogonal to the first axis, and the removable I/O modules may include shared I/O modules. In an embodiment the second axis may be parallel to the first axis, and the removable I/O modules may include individual I/O modules.

20 Claims, 6 Drawing Sheets

(56) References Cited

U.S. PATENT DOCUMENTS

| | | | |
|---|---|---|---|
| 2006/0294112 A1* | 12/2006 | Mandato | H04L 29/06027 |
| 2007/0008902 A1* | 1/2007 | Yaramada | H04L 12/5695 |
| | | | 370/252 |
| 2008/0025292 A1* | 1/2008 | King | G06F 1/183 |
| | | | 370/352 |
| 2008/0155571 A1* | 6/2008 | Kenan | G06F 9/542 |
| | | | 719/326 |
| 2008/0222310 A1* | 9/2008 | Karstens | G06F 1/183 |
| | | | 710/2 |
| 2008/0248684 A1* | 10/2008 | Filipon | H01R 13/6658 |
| | | | 439/485 |
| 2008/0256271 A1* | 10/2008 | Breed | G06F 12/06 |
| | | | 710/52 |
| 2008/0310100 A1* | 12/2008 | Sherrod | H05K 7/20181 |
| | | | 361/679.49 |
| 2008/0316921 A1* | 12/2008 | Mathews | H04L 47/10 |
| | | | 370/230 |
| 2008/0320254 A1* | 12/2008 | Wingard | G06F 12/0607 |
| | | | 711/157 |
| 2009/0228535 A1* | 9/2009 | Rathi | G06F 3/048 |
| 2010/0169534 A1* | 7/2010 | Saarinen | G06F 1/266 |
| | | | 710/316 |
| 2010/0307798 A1* | 12/2010 | Izadian | H01L 24/24 |
| | | | 174/255 |
| 2011/0268441 A1* | 11/2011 | Goldstein | G02B 6/3512 |
| | | | 398/45 |
| 2012/0210095 A1* | 8/2012 | Nellans | G06F 12/1072 |
| | | | 711/206 |
| 2012/0236488 A1* | 9/2012 | Wallace | H05K 5/023 |
| | | | 361/679.31 |
| 2014/0126129 A1* | 5/2014 | Kyle | G06F 1/187 |
| | | | 361/679.02 |
| 2014/0334084 A1* | 11/2014 | Fricker | H05K 1/14 |
| | | | 361/679.4 |
| 2014/0344493 A1* | 11/2014 | Feng | G06F 13/4081 |
| | | | 710/302 |
| 2016/0058188 A1* | 3/2016 | Charest | A47B 88/12 |
| | | | 248/636 |
| 2016/0165743 A1* | 6/2016 | Milligan | H05K 7/1409 |
| | | | 361/679.31 |
| 2016/0337272 A1* | 11/2016 | Berman | H04L 49/70 |

* cited by examiner

INTERCHANGEABLE I/O MODULES WITH INDIVIDUAL AND SHARED PERSONALITIES

FIELD

This disclosure relates generally to information handling systems, and more specifically, to methods and systems for interchangeable input/output (I/O) modules with individual and shared personalities.

BACKGROUND

Modular server systems, such as blade systems, include a chassis that houses multiple input/output (I/O) devices that the server may interface with in order to perform various functions. Different use cases typically call for having either discrete dedicated I/O devices per server, or shared common I/O devices in each server. Conventional modular server system chassis are designed to handle I/O devices of a single type. For example, a first blade server will typically include only individual dedicated modules, while a second blade server will only include shared common I/O modules, and so forth. This arrangement impedes flexibility for the user and adds complexity to inventory management systems because additional stock keeping units (SKUs) are required to track the various blade systems. Furthermore, when shared/aggregated I/O modules are not needed, monolithic pass-thru I/O modules are typically used in their place. These monolithic modules treat each server commonly and do not allow for per-server differences in the type of I/O devices and/or system speed. Similarly, conventional server systems do not allow the I/O hardware to be left out of systems that do not have an I/O requirement.

SUMMARY

Methods and systems for connecting interchangeable input/output (I/O) modules having individual and shared personalities are described. In one embodiment a method may include a generic I/O bay of a server hosting one or more compute nodes configured to be connected to one or more removable I/O modules. A first connector coupled to a first I/O module may connect the first I/O module to a compute node having a second connector. The first I/O module may be oriented about a first axis. The compute node may be oriented about a second axis. The first connector and the second connector may be capable of being connected in a plurality of orientations.

In one embodiment the second axis may be orthogonal to the first axis, and the removable I/O modules may include shared I/O modules. In an embodiment the second axis may be parallel to the first axis, and the removable I/O may include individual I/O modules. In various embodiments the removable I/O modules may include Ethernet modules, peripheral component interconnect express (PCIe) modules, and/or modules having ultra-high speed customized cabled fabrics.

In one embodiment a system for connecting interchangeable I/O modules having individual and shared personalities may include a generic I/O bay of a server configured for hosting one or more compute nodes configured to be connected to one or more removable I/O modules. The system may include a first I/O module having a first connector configured for connecting the first I/O module to a compute node having a second connector. The first I/O module may be oriented about a first axis. The compute node may be oriented about a second axis. The first connector and the second connector may be capable of being connected in a plurality of orientations. In one embodiment the second axis may be orthogonal to the first axis, and the removable I/O modules may include shared I/O modules. In an embodiment the second axis may be parallel to the first axis, and the removable I/O may include individual I/O modules. In various embodiments the removable I/O modules may include Ethernet modules, peripheral component interconnect express (PCIe) modules, and/or modules having ultra-high speed customized cabled fabrics.

In one embodiment an apparatus for connecting interchangeable I/O modules having individual and shared personalities may include a generic I/O bay of a server configured for hosting one or more compute nodes configured to be connected to one or more removable I/O modules. The apparatus may include a first I/O module having a first connector configured for connecting the first I/O module to a compute node having a second connector. The first I/O module may be oriented about a first axis. The compute node may be oriented about a second axis. The first connector and the second connector may be capable of being connected in a plurality of orientations. In one embodiment the second axis may be orthogonal to the first axis, and the removable I/O modules may include shared I/O modules. In an embodiment the second axis may be parallel to the first axis, and the removable I/O may include individual I/O modules. In various embodiments the removable I/O modules may include Ethernet modules, peripheral component interconnect express (PCIe) modules, and/or modules having ultra-high speed customized cabled fabrics.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of methods and systems for a method for interchangeable input/output (I/O) modules with individual and shared personalities are described. In an embodiment, an information handling system, such as a blade server, may include a generic I/O bay capable of being reconfigured to host either shared I/O modules or discrete I/O modules.

In one embodiment the generic I/O bay (e.g., a modular server chassis) may include shared I/O modules oriented in one axis, or discrete I/O modules oriented in an orthogonal axis. The server and the I/O modules may be connected with "pairs of halves" connectors. For example, if the generic I/O bay is configured for shared I/O modules each "half" connector provides I/O signaling to a redundant I/O module yielding redundant I/O. Conversely, if the generic I/O bay is configured for individual dedicated I/O modules the two halves are used in a unified fashion, thereby providing twice the I/O bandwidth since redundancy is not necessary. Similarly, "orthogonal" high-speed connectors may be utilized to connect the I/O modules to the server in the generic I/O bay.

The present invention thus provides an ease of interchangeability between individual I/O modules and shared I/O modules. The general availability of "orthogonal" high-speed connectors enables the mid-plane to be designed out, thereby creating a cost reduction in the interconnect between the server and the I/O modules. Furthermore, since the generic I/O bay is capable of being reconfigured to house shared I/O modules oriented in one axis and individual I/O modules oriented in an orthogonal axis, the user may swap out the I/O modules easily for different types of I/O modules. For example, the generic I/O bay may be efficiently reconfigured to house fabric pass-thru modules (e.g., Ethernet modules), industry standard modules (e.g., peripheral component interconnect express (PCIe) modules), or ultra-high speed proprietary cabled fabrics in a cost-effective manner.

Figure 1:
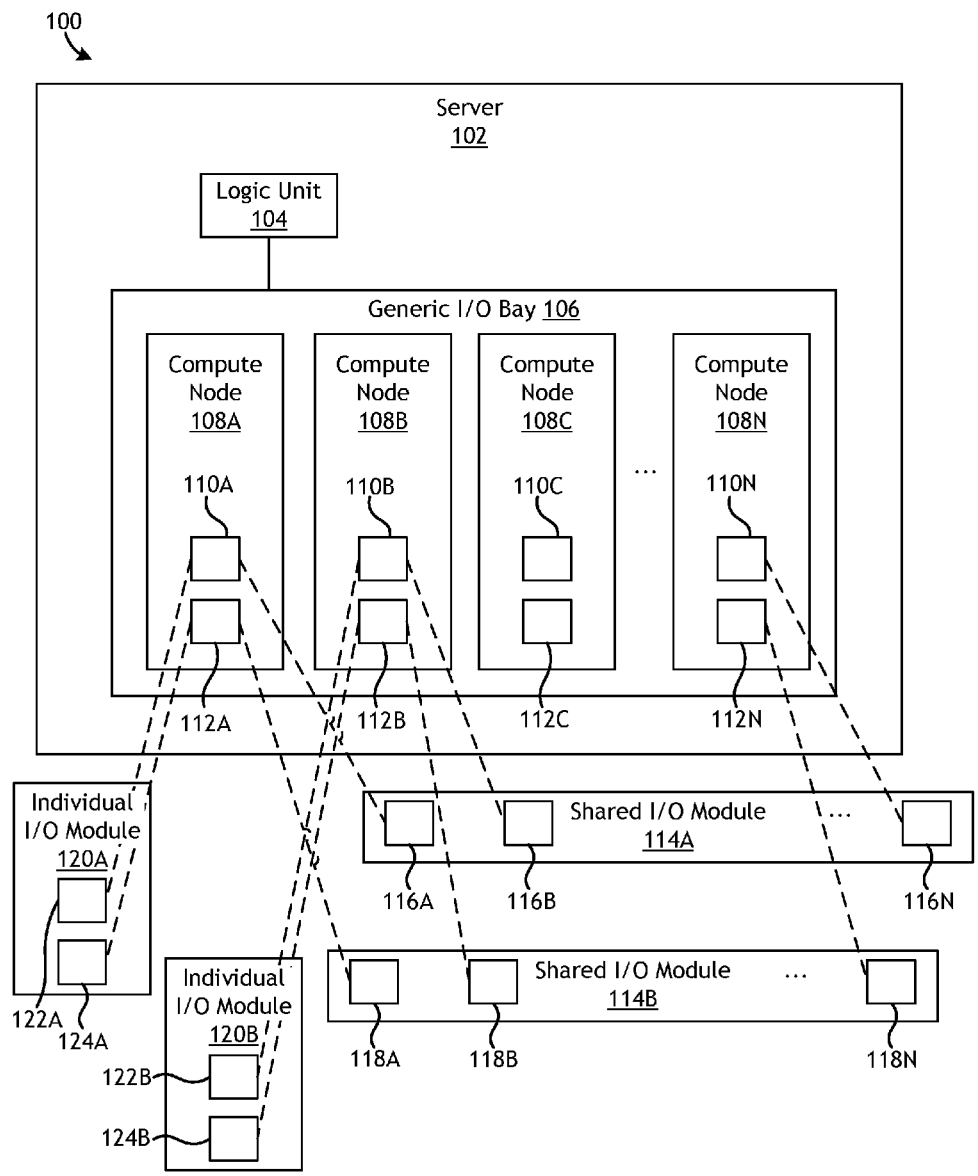
FIG. 1 is a schematic block diagram illustrating one embodiment of a system configured for interchangeable input/output (I/O) modules with individual and shared personalities.

FIG. 1 is a schematic circuit block diagram illustrating one embodiment of an information handling system 100 configured for interchangeable I/O modules with individual and shared personalities. In one embodiment, the information handling system 100 may include a server 102. The server 102 may include a logic unit 104 and a generic I/O bay 106. In an embodiment the generic I/O bay 106 may include one or more compute nodes 108A-N, each of which may include a first connector 110A-N and a second connector 112A-N, respectively. In one embodiment, first connectors 110A-N and second connectors 112A-N may be configured to host one or more shared I/O modules 114A-B oriented about a first axis or one or more individual I/O modules 120A-B oriented about a second axis. In an embodiment the first axis may be orthogonal (i.e., perpendicular to the first axis).

In one embodiment, shared I/O module 114A may include connectors 116A-N that are configured to be coupled to either first connectors 110A-N or second connectors 112A-N. Shared I/O module 114A may thus be simultaneously coupled to (i.e., shared by) compute nodes 108A-N. In such an embodiment, each compute mode may include dual connectors per compute node for redundancy with dual I/O modules. Similarly, shared I/O module 114B may include connectors 118A-N configured to be coupled to either first connectors 110A-N or second connectors 112A-N. In an embodiment, shared I/O module 114A and shared I/O module 114B may both be connected to compute nodes 108A-N via first connectors 110A-N and second connectors 112A-N, respectively, if a user of server 102 desires to utilize multiple shared I/O modules. In another embodiment, only one of shared I/O modules 114A-B may be connected to compute nodes 108A-N based on the needs of a user of server 102. One or more shared I/O modules 114A-B may thus be connected to and shared by all of the compute nodes 108A-N in generic I/O bay 106.

In an embodiment, individual I/O module 120A may include a first connector 122A and a second connector 124A. Similarly, individual I/O module 120B may include a first connector 122B and a second connector 124B. In various embodiments, individual I/O module 120A may be coupled to one of compute nodes 108A-N and/or individual I/O module 120B may be coupled to one of compute nodes 108A-N. For example, individual I/O module 120A may be coupled to compute node 108A, while individual I/O module 120B may be coupled to compute node 108B. In an embodiment, an individual I/O configuration may include an I/O module capturing I/O signaling from both halves of the pair of connectors of a compute node. Individual I/O module 120A and/or individual I/O module 120B may thus be configured to be connected to one of compute nodes 108A-N at a given time. Although each individual I/O module may be used by a single compute node at a given time, in an embodiment an individual I/O module may be selectively added to generic I/O bay 106, removed from generic I/O bay 106, or moved from one of compute nodes 108A-N to another of compute nodes 108A-N based on the needs of a user of server 102.

Figure 6:
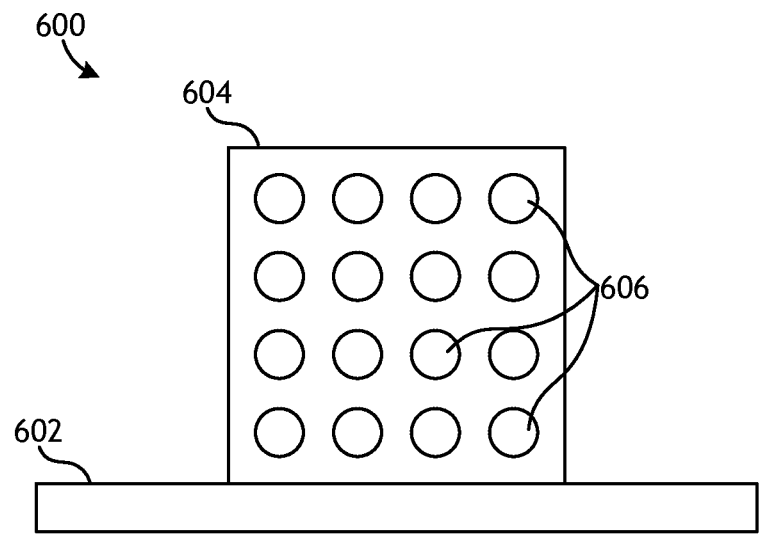
FIG. 6 is a schematic block diagram illustrating one embodiment of an apparatus configured for interchangeable I/O modules with individual and shared personalities.
Figure 7:
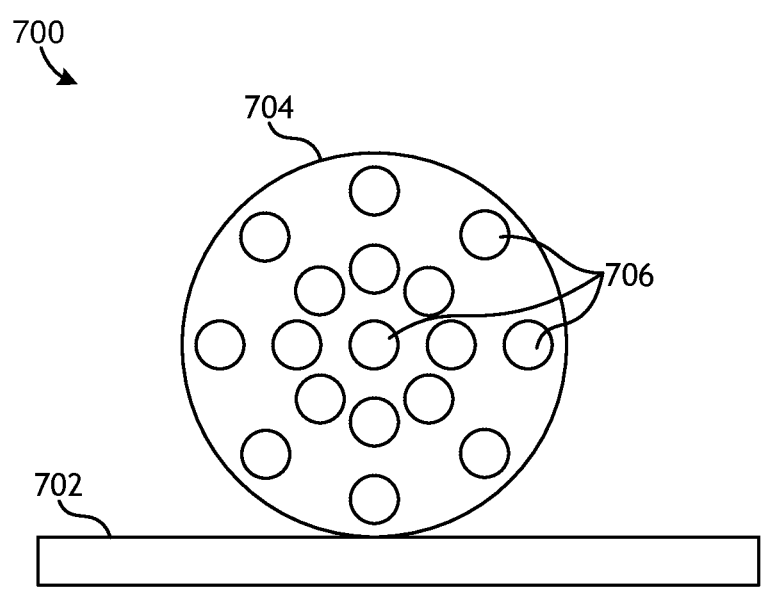
FIG. 7 is a schematic block diagram illustrating another embodiment of an apparatus configured for interchangeable I/O modules with individual and shared personalities.

In various embodiments, first connectors 110A-N, second connectors 112A-N, connectors 116A-N, connectors 118A-N, first connectors 122A-B, and/or second connectors 124A-B may be implemented as connector modules similar to those described in FIG. 6 and FIG. 7. In one embodiment, the connectors depicted in FIG. 1 may thus be "orthogonal" high speed connectors having male and female counterpart components. In an embodiment, the orthogonal connectors of one or more compute nodes 108A-N and/or I/O modules (e.g., shared I/O modules 114A-B and/or individual I/O modules 120A-B) may be upgraded over time to support higher data speeds without burdening or jeopardizing the entire infrastructure cost of the network associated with server 102.

Figure 2:
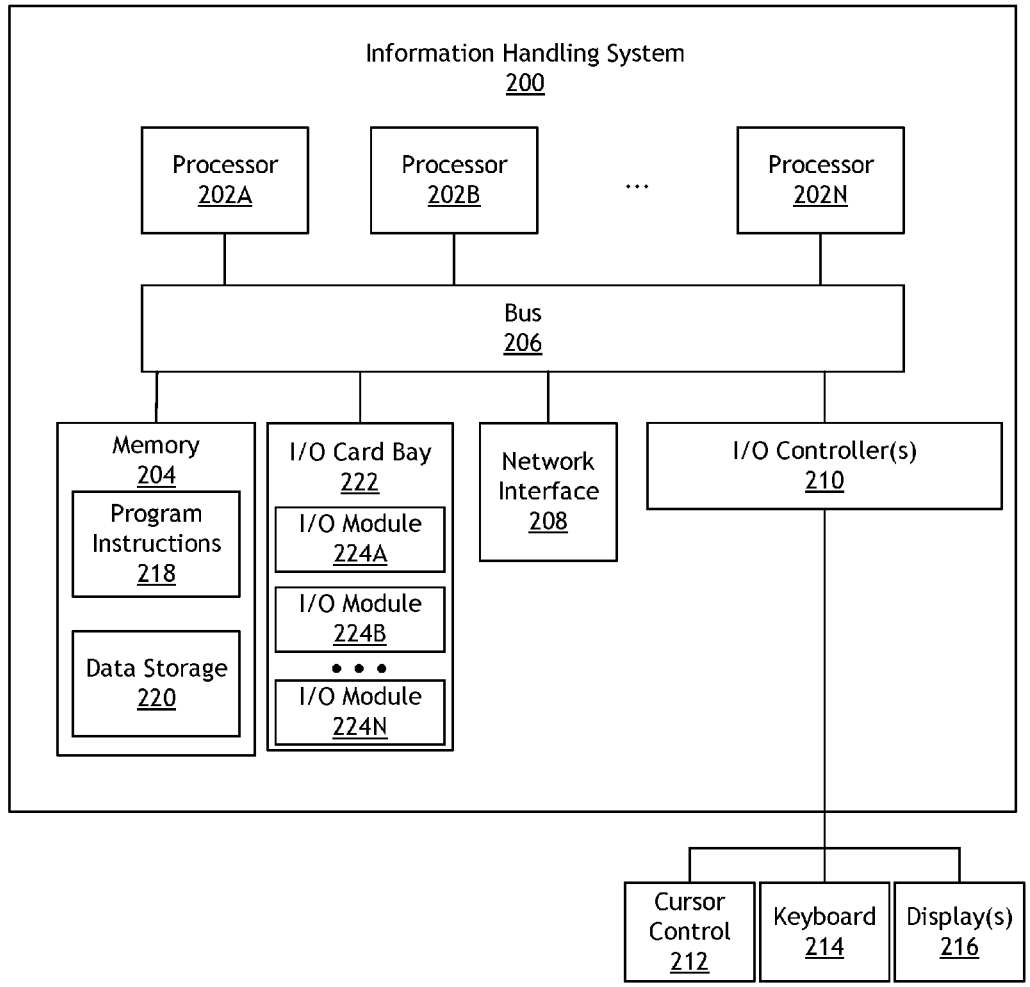
FIG. 2 is a schematic block diagram illustrating one embodiment of an Information Handling System (IHS) configured for interchangeable I/O modules with individual and shared personalities.

FIG. 2 is a schematic block diagram illustrating one embodiment of an Information Handling System (IHS) configured for interchangeable I/O modules with individual and shared personalities. In one embodiment, server 102 may be implemented on an information handling system similar to IHS 200 described in FIG. 2. In various embodiments, IHS 200 may be a server, a mainframe computer system, a workstation, a network computer, a desktop computer, a laptop, or the like.

As illustrated, IHS 200 includes one or more processors 202A-N coupled to a system memory 204 via bus 206. IHS 200 further includes network interface 208 coupled to bus 206, and input/output (I/O) controller(s) 210, coupled to devices such as cursor control device 212, keyboard 214, and display(s) 216. In some embodiments, a given entity (e.g., server 102) may be implemented using a single instance of IHS 200, while in other embodiments multiple such information handling systems, or multiple nodes making up IHS 200, may be configured to host different portions or instances of embodiments (e.g., generic I/O bay 106).

In various embodiments, IHS 200 may be a single-processor information handling system including one processor 202A, or a multi-processor information handling system including two or more processors 202A-N (e.g., two, four, eight, or another suitable number). Processor(s) 202A-N may be any processor capable of executing program instructions. For example, in various embodiments, processor(s) 202A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 202A-N may commonly, but not necessarily, implement the same ISA. Also, in some embodiments, at least one processor(s) 202A-N may be a graphics processing unit (GPU) or other dedicated graphics-rendering device.

System memory 204 may be configured to store program instructions and/or data accessible by processor(s) 202A-N. For example, memory 204 may be used to store software program and/or database shown in FIG. 3. In various embodiments, system memory 204 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 204 as program instructions 218 and data storage 220, respectively. In other embodiments, program instructions and/or data may be received, sent or stored upon different types of IHS-accessible media or on similar media separate from system memory 204 or IHS 200. Generally speaking, a IHS-accessible medium may include any tangible, non-transitory storage media or memory media such as electronic, magnetic, or optical media-e.g., disk or CD/DVD-ROM coupled to IHS 200 via bus 206, or non-volatile memory storage (e.g., "flash" memory)

The terms "tangible" and "non-transitory," as used herein, are intended to describe an IHS-readable storage medium (or "memory") excluding propagating electromagnetic signals, but are not intended to otherwise limit the type of physical IHS-readable storage device that is encompassed by the phrase IHS-readable medium or memory. For instance, the terms "non-transitory IHS readable medium" or "tangible memory" are intended to encompass types of storage devices that do not necessarily store information permanently, including for example, random access memory (RAM). Program instructions and data stored on a tangible IHS-accessible storage medium in non-transitory form may further be transmitted by transmission media or signals such as electrical, electromagnetic, or digital signals, which may be conveyed via a communication medium such as a network and/or a wireless link.

In an embodiment, bus 206 may be configured to coordinate I/O traffic between processor 202, system memory 204, I/O card bay 222, and any peripheral devices including network interface 208 or other peripheral interfaces, connected via I/O controller(s) 210. In some embodiments, bus 206 may perform any necessary protocol, timing or other data transformations to convert data signals from one component (e.g., system memory 204 or I/O card bay 222) into a format suitable for use by another component (e.g., processor(s) 202A-N). In some embodiments, bus 206 may include support for devices attached through various types of peripheral buses, such as a variant of the Peripheral Component Interconnect (PCI) bus standard or the Universal Serial Bus (USB) standard, for example. In some embodiments, the operations of bus 206 may be split into two or more separate components, such as a north bridge and a south bridge, for example. In addition, in some embodiments some or all of the operations of bus 206, such as an interface to system memory 204, may be incorporated directly into processor(s) 202A-N. In an embodiment I/O card bay 222 may include multiple I/O modules 224A-N, each of which may be communicatively connected to processor 202 and/or other peripheral devices via bus 206.

Network interface 208 may be configured to allow data to be exchanged between IHS 200 and other devices, such as other information handling systems attached to generic I/O bay 106, for example. In various embodiments, network interface 208 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 210 may, in some embodiments, enable connection to one or more display terminals, keyboards, keypads, touch screens, scanning devices, voice or optical recognition devices, or any other devices suitable for entering or retrieving data by one or more IHS 200. Multiple input/output devices may be present in IHS 200 or may be distributed on various nodes of IHS 200. In some embodiments, similar I/O devices may be separate from IHS 200 and may interact with IHS 200 through a wired or wireless connection, such as over network interface 208.

As shown in FIG. 2, memory 204 may include program instructions 218, configured to implement certain embodiments described herein, and data storage 220, comprising various data accessible by program instructions 218. In an embodiment, program instructions 218 may include software elements of embodiments illustrated in FIG. 3. For example, program instructions 218 may be implemented in various embodiments using any desired programming language, scripting language, or combination of programming languages and/or scripting languages. Data storage 220 may include data that may be used in these embodiments such as, for example, logic unit 104. In other embodiments, other or different software elements and data may be included.

A person of ordinary skill in the art will appreciate that IHS 200 is merely illustrative and is not intended to limit the scope of the disclosure described herein. In particular, the information handling system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other information handling system configurations.

Embodiments of server 102 described in FIG. 1 may be implemented in an information handling system that is similar to IHS 200. In one embodiment, the elements described in FIG. 1, FIG. 3, FIG. 4, FIG. 5, FIG. 6, FIG. 7, FIG. 8, and/or FIG. 9 may be implemented in discrete hardware modules. Alternatively, the elements may be implemented in software-defined modules which are executable by one or more of processors 202A-N, for example.

Figure 3:
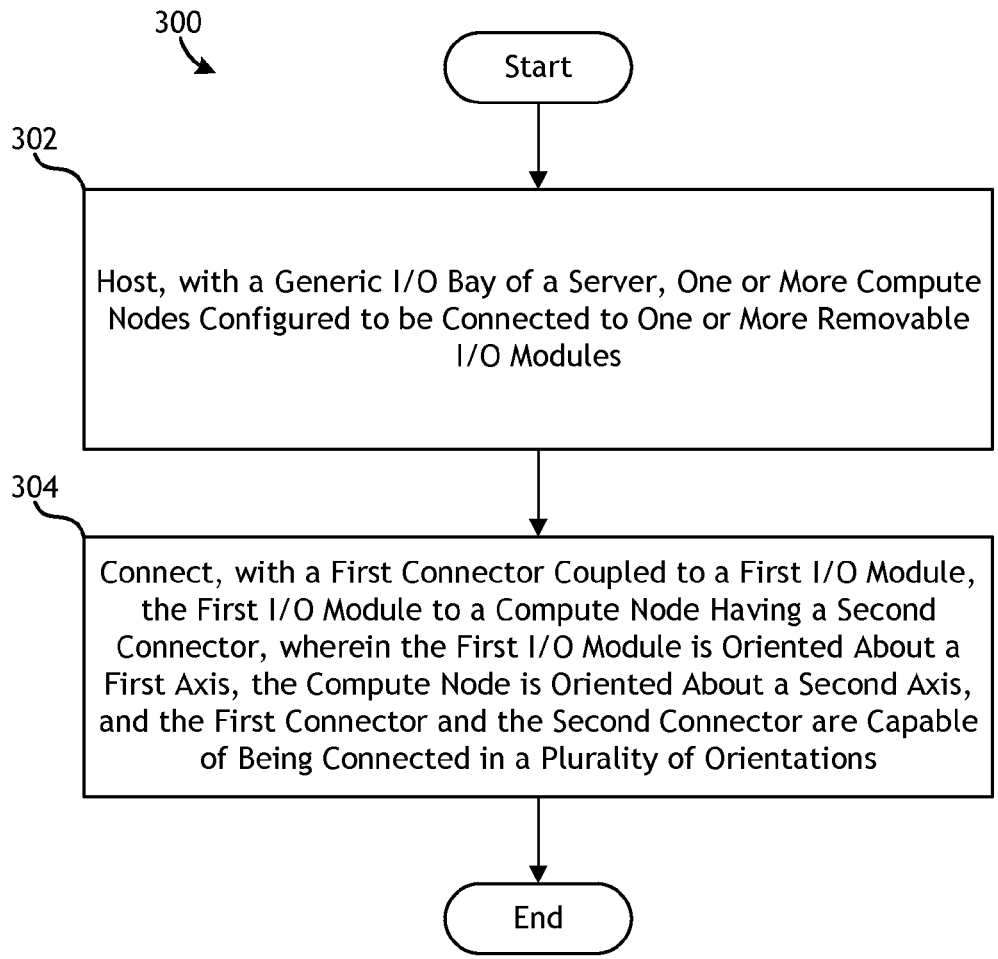
FIG. 3 is a schematic flowchart diagram illustrating one embodiment of a method for interchangeable I/O modules with individual and shared personalities.

FIG. 3 is a schematic flowchart diagram illustrating one embodiment of a method 300 for interchangeable I/O modules with individual and shared personalities. At block 302, the method 300 includes a generic I/O bay 106 of a server 102 hosting one or more compute nodes 108A-N configured to be connected to one or more removable I/O modules, such as shared I/O modules 114A-B or individual I/O modules 120A-B. As depicted in block 304, a first connector coupled to a first I/O module connects the first I/O module to a compute node having a second connector, wherein the first I/O module is oriented about a first axis, the compute node is oriented about a second axis, and the first connector and the second connector are capable of being connected in a plurality of orientations.

Figure 4:
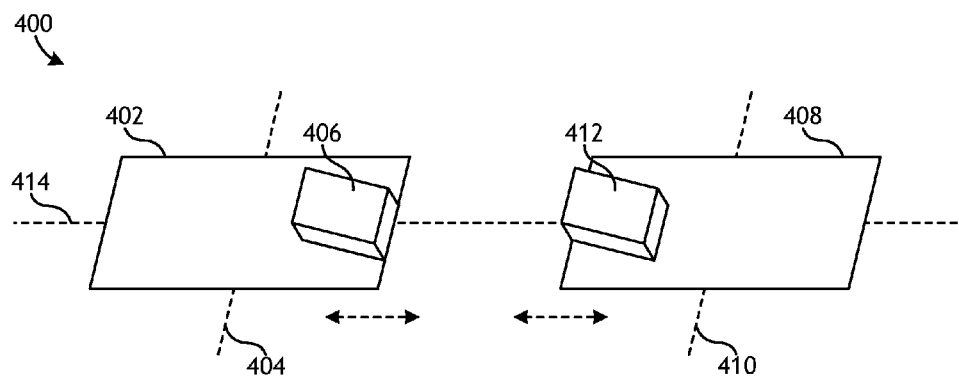
FIG. 4 is a schematic block diagram illustrating one embodiment of an apparatus configured for interchangeable I/O modules with individual and shared personalities.

FIG. 4 is a schematic block diagram illustrating one embodiment of an apparatus 400 configured for interchangeable I/O modules with individual and shared personalities. As depicted, the apparatus 400 may include a first I/O module 402 oriented about a first axis 404. As shown the first I/O module 402 includes a connector 406 coupled to the first I/O module 402. In an embodiment the apparatus 400 may also include a second I/O module 408 oriented about a second axis 410. The second I/O module 408 may include a second connector 412 coupled to the second I/O module 408. The first I/O module 402 and the second I/O module 408 may also be oriented about a connection axis 414. In one embodiment the first axis 404 and the second axis 410 may be parallel, such that first connector 406 and second connector 412 may be communicatively connected by a user of apparatus 400 adjusting the positions of the first I/O module 402 and/or the second I/O module 408 along the connection axis 414.

In one embodiment the first I/O module 402 may be connected to an I/O bay, such as generic I/O bay 106 or I/O card bay 222, and the second I/O module 408 may be a common shared I/O module, such as shared I/O module 114A, capable of being moved within apparatus 400 by a user. A user of an information handling system, such as apparatus 400, may thus selectively configure apparatus 400 by moving the second I/O module 408 along the connection axis 414 until the second connector 412 comes into contact with and is thus communicatively connected to the first connector 406. Similarly, the user may selectively disconnect the second connector 412 from the first connector 406 by moving the second I/O module 408 along the connection axis 414 until the second connector 412 is no longer in contact with the first connector 406.

Figure 5:
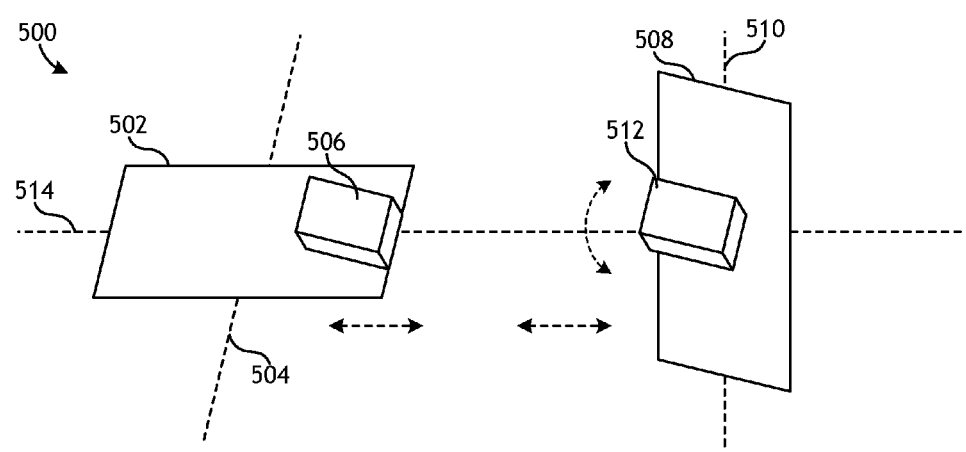
FIG. 5 is a schematic block diagram illustrating another embodiment of an apparatus configured for interchangeable I/O modules with individual and shared personalities.

FIG. 5 is a schematic block diagram illustrating another embodiment of an apparatus 500 configured for interchangeable I/O modules with individual and shared personalities. As depicted, the apparatus 500 may include a first I/O module 502 oriented about a first axis 504. As shown the first I/O module 502 includes a connector 506 coupled to the first I/O module 502. In an embodiment the apparatus 500 may also include a second I/O module 508 oriented about a second axis 510. The second I/O module 508 may include a second connector 512 coupled to the second I/O module 508. The first I/O module 502 and the second I/O module 508 may also be oriented about a connection axis 514. In one embodiment the first axis 504 and the second axis 510 may be orthogonal (i.e., perpendicular at a 90 degree angle), such that first connector 506 and second connector 512 may be communicatively connected by a user of apparatus 500. In other embodiments the first axis 504 and the second axis 510 may be oriented at any non-parallel angle, such that the first I/O module 502 and the second I/O module may be communicatively connected at multiple angles about connection axis 514 by a user of apparatus 500.

In one embodiment the first I/O module 502 may be connected to an I/O bay, such as generic I/O bay 106 or I/O card bay 222, and the second I/O module 508 may be a dedicated individual (i.e., discrete) I/O module, such as individual I/O module 120A, capable of being moved within apparatus 500 by a user. A user of an information handling system, such as apparatus 500, may thus selectively configure apparatus 500 by moving the second I/O module 508 along the connection axis 514 until the second connector 512 comes into contact with and is thus communicatively connected to the first connector 506. Similarly, the user may selectively disconnect the second connector 512 from the first connector 506 by moving the second I/O module 508 along the connection axis 514 until the second connector 512 is no longer in contact with the first connector 506.

FIG. 6 is a schematic block diagram illustrating one embodiment of an apparatus 600 configured for interchangeable I/O modules with individual and shared personalities. As depicted, in one embodiment the apparatus 600 may include an I/O module 602 coupled to a connector 604. In an embodiment the connector 604 may have one or more connection points 606 capable of making contact with similar connection points in a separate counterpart connector. In one embodiment, the connection points 606 may be male connections, such as metallic pins arranged such that connector 604 is capable of functioning identically if oriented in either a first position or a second orthogonal (i.e., perpendicular) position relative to the first position. In another embodiment, the connection points 606 may be female connections, such as holes with a metallic lining arranged such that connector 604 is capable of functioning identically if oriented in either a first position or a second orthogonal (i.e., perpendicular) position relative to the first position.

A user of apparatus 600 may thus communicatively connect a male connector to a female counterpart connector if the male connector is oriented along either a first parallel axis or a second orthogonal axis with respect to the female connector. Similarly, a user of apparatus 600 may communicatively connect a female connector to a male counterpart connector if the female connector is oriented along either a first parallel axis or a second orthogonal axis with respect to the male connector. Connector 604 thereby enables a user of apparatus 600 to selectively connect I/O module 602 to a counterpart I/O module along either a first parallel axis or a second orthogonal axis. One skilled in the art will appreciate that I/O module 602 may also be represented by one of shared I/O modules 114A-B, one of individual I/O modules 120A-B, one of I/O modules 224A-N, first I/O module 402, second I/O module 408, first I/O module 502, and/or second I/O module 508, as depicted in FIG.1, FIG. 2, FIG. 4, and FIG. 5, respectively.

FIG. 7 is a schematic block diagram illustrating another embodiment of an apparatus 700 configured for interchangeable I/O modules with individual and shared personalities. As depicted, in one embodiment the apparatus 700 may include an I/O module 702 coupled to a connector 704. In an embodiment the connector 704 have one or more connection points 706 capable of making contact with similar connection points in a separate counterpart connector. In one embodiment, the connection points 706 may be male connections, such as metallic pins arranged such that connector 704 is capable of functioning identically if oriented in multiple positions about a connection axis relative to a counterpart connector. In another embodiment, the connection points 706 may be female connections, such as holes with a metallic lining arranged such that connector 704 is capable of functioning identically if oriented in one of multiple angles about a connection axis relative to a counterpart connector.

A user of apparatus 700 may thus communicatively connect a male connector to a female counterpart connector if the male connector is oriented at multiple angles about a connection axis. Similarly, a user of apparatus 700 may communicatively connect a female connector to a male counterpart connector if the female connector is oriented at multiple angles about a connection axis. Connector 704 thereby enables a user of apparatus 700 to selectively connect I/O module 702 to a counterpart I/O module at one or more angles along a connection axis. One skilled in the art will appreciate that I/O module 702 may also be represented by one of shared I/O modules 114A-B, one of individual I/O modules 120A-B, one of I/O modules 224A-N, first I/O module 402, second I/O module 408, first I/O module 502, and/or second I/O module 508, as depicted in FIG. 1, FIG. 2, FIG. 4, and FIG. 5, respectively.

Figure 8:
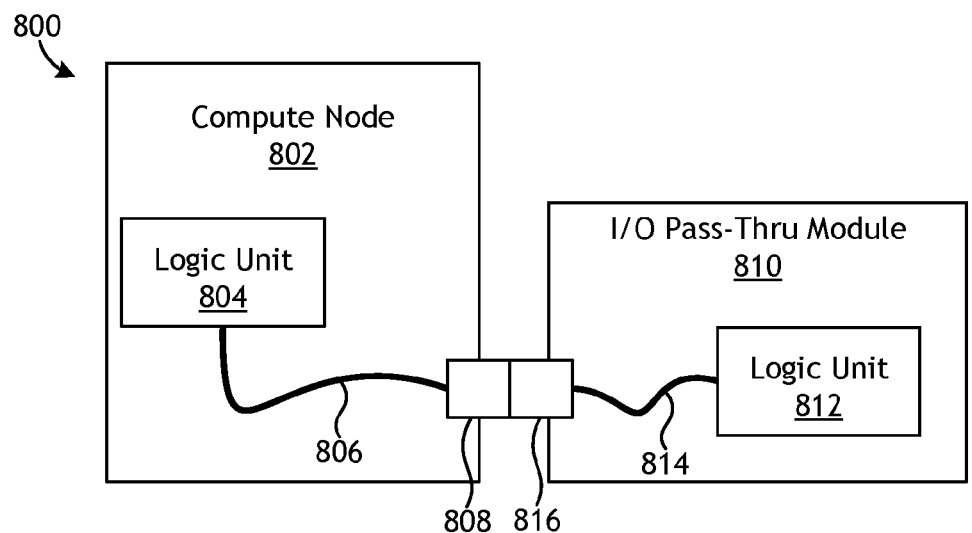
FIG. 8 is a schematic block diagram illustrating one embodiment of a system configured for interchangeable I/O modules with individual and shared personalities.

FIG. 8 is a schematic block diagram illustrating one embodiment of a system 800 configured for interchangeable I/O modules with individual and shared personalities. In an embodiment, system 800 may be configured similarly to system 100 of FIG. 1. In one embodiment, the system 800 may include a compute node 802 having a logic unit 804, a cabled bus interface 806, and a connector 808. The system 800 may also include an I/O pass-thru module 810 having a logic unit 812, a cabled bus interface 814, and a connector 816. In one embodiment, cabled bus interface 806 and/or cabled bus interface 814 may be compatible with the Intel® "Storm Lake" interconnect technology. In an embodiment, connectors 808 and 816 may be "blind-mate" connectors configured for use with cabled busses. In various embodiments, orthogonal connectors may thus be swapped out with blind-mate connectors to enable one or more compute nodes, such as compute node 802, of a server system to interface with I/O pass-thru modules.

Figure 9:
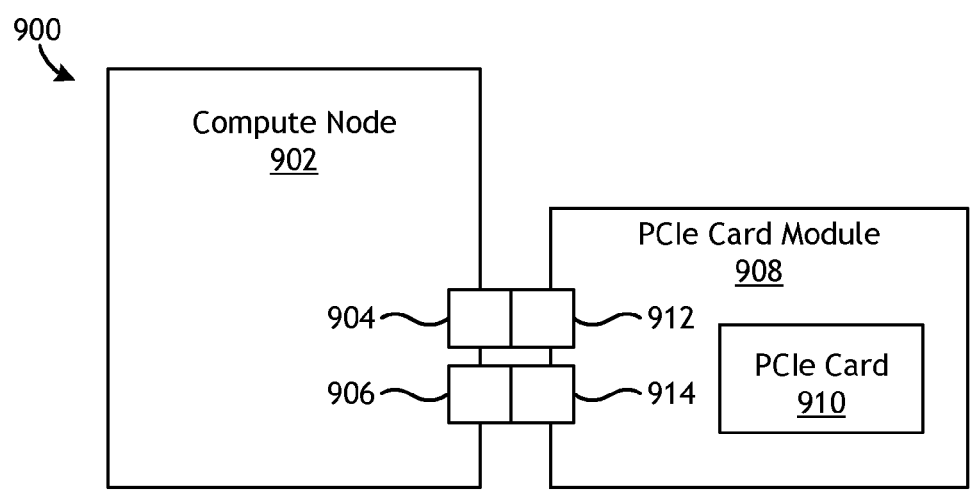
FIG. 9 is a schematic block diagram illustrating one embodiment of a system configured for interchangeable I/O modules with individual and shared personalities.

FIG. 9 is a schematic block diagram illustrating one embodiment of a system 900 configured for interchangeable I/O modules with individual and shared personalities. In an embodiment, system 900 may be configured similarly to system 100 of FIG. 1. In one embodiment, the system 900 may include a compute node 902 having a first connector 904 and a second connector 906. In an embodiment, a PCIe card module 908 having a PCIe card 910, a first connector 912, and a second connector 914 may be connected to compute node 902. In various embodiments of system 100 of FIG. 1, a PCIe card module, such as PCIe card module 908 of FIG. 9, may thus replace one or more I/O modules and/or I/O pass-thru modules.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method of connecting interchangeable input/output (I/O) modules having individual and shared personalities, comprising:
hosting, with a generic I/O bay of a server, one or more compute nodes configured to be connected to one or more removable I/O modules; and
connecting, with a first connector of a first removable I/O module, the first I/O module to a compute node having a second connector, independent of a mid-plane of the server, wherein:
the first I/O module is oriented about a first axis;
the compute node is oriented about a second axis;
the first connector and the second connector are capable of being connected, independent of the mid-plane of the server, in a plurality of orientations; and
the first connector and the second connector comprise a pair of corresponding male and female connectors.

2. The method of claim 1, wherein second axis is orthogonal to the first axis.

3. The method of claim 2, wherein the removable I/O modules further comprise shared I/O modules.

4. The method of claim 1, wherein the second axis is parallel to the first axis.

5. The method of claim 4, wherein the removable I/O modules further comprise individual I/O modules.

6. The method of claim 1, wherein one of the removable I/O modules comprises at least one of an Ethernet module and a peripheral component interconnect express (PCIe) module.

7. The method of claim 1, wherein the compute node comprises a third connector, wherein the third connector is capable of being connected to the first I/O module when the first connector of the first I/O module is connected to the second connector of the compute node in a first orientation, and wherein the third connector is capable of being connected to a second I/O module when the first connector of the first I/O module is connected to the second connector of the compute node in a second orientation.

8. A system for connecting interchangeable input/output (I/O) modules having individual and shared personalities, comprising:
- a generic I/O bay of a server configured for hosting one or more compute nodes configured to be connected to one or more removable I/O modules; and
- a first removable I/O module having a first connector configured for connecting the first I/O module to a compute node having a second connector, independent of a mid-plane of the server, wherein:
    - the first I/O module is oriented about a first axis;
    - the compute node is oriented about a second axis;
    - the first connector and the second connector are capable of being connected, independent of the mid-plane of the server, in a plurality of orientations; and
    - the first connector and the second connector comprise a pair of corresponding male and female connectors.

9. The system of claim 8, wherein the second axis is orthogonal to the first axis.

10. The system of claim 9, wherein the removable I/O modules further comprise shared I/O modules.

11. The system of claim 8, wherein the second axis is parallel to the first axis.

12. The system of claim 11, wherein the removable I/O modules further comprise individual I/O modules.

13. The system of claim 8, wherein one of the removable I/O modules comprises at least one of an Ethernet module and a peripheral component interconnect express (PCIe) module.

14. The system of claim 8, wherein the compute node comprises a third connector, wherein the third connector is capable of being connected to the first I/O module when the first connector of the first I/O module is connected to the second connector of the compute node in a first orientation, and wherein the third connector is capable of being connected to a second I/O module when the first connector of the first I/O module is connected to the second connector of the compute node in a second orientation.

15. An apparatus for connecting interchangeable input/output (I/O) modules having individual and shared personalities, comprising:
- a generic I/O bay of a server configured for hosting one or more compute nodes configured to be connected to one or more removable I/O modules, independent of a mid-plane of the server; and
- a first removable I/O module having a first connector configured for connecting the first I/O module to a compute node having a second connector, wherein:
    - the first I/O module is oriented about a first axis;
    - the compute node is oriented about a second axis;
    - the first connector and the second connector are capable of being connected, independent of the mid-plane of the server, in a plurality of orientations; and
    - the first connector and the second connector comprise a pair of corresponding male and female connectors.

16. The apparatus of claim 15, wherein the second axis is orthogonal to the first axis.

17. The apparatus of claim 16, wherein the removable I/O modules further comprise shared I/O modules.

18. The apparatus of claim 15, wherein the second axis is parallel to the first axis.

19. The apparatus of claim 18, wherein the removable I/O modules further comprise individual I/O modules.

20. The apparatus of claim 15, wherein one of the removable I/O modules comprises a peripheral component interconnect express (PCIe) module.

* * * * *